(12) United States Patent
Vuong et al.

(10) Patent No.: US 7,769,415 B2
(45) Date of Patent: Aug. 3, 2010

(54) SYSTEM AND METHOD FOR ACTIVATING A COMMUNICATION DEVICE BASED ON USAGE INFORMATION

(75) Inventors: Thanh Vinh Vuong, Kitchener (CA); Steven Fyke, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 899 days.

(21) Appl. No.: 10/995,220

(22) Filed: Nov. 24, 2004

(65) Prior Publication Data

US 2006/0116178 A1    Jun. 1, 2006

(51) Int. Cl.
*H04B 1/38* (2006.01)
*H04B 1/04* (2006.01)
*H04B 1/16* (2006.01)
*H01Q 11/12* (2006.01)
*H04W 4/00* (2009.01)
*H02J 7/00* (2006.01)
*G08B 5/22* (2006.01)
*G08B 21/00* (2006.01)
*H04Q 1/30* (2006.01)

(52) U.S. Cl. .......... 455/574; 455/127.1; 455/343.1; 455/463; 455/572; 320/132; 320/138; 340/7.32; 340/636.1; 340/636.2

(58) Field of Classification Search .......... 455/3.3, 455/13.4, 522, 571, 572, 573, 574, 127.1, 455/127.2, 127.3, 127.5, 298, 299, 343.1–343.6, 455/FOR. 235, FOR. 236, 38.3, 67, 69, 226, 455/228, 230, 231, 434, 456.1–456.4, 463, 455/517, 566, 567, 405, 422.1, 423, 462; 320/112, 114, 124, 127, 132, 133, 138, 151; 713/300, 320, 330, 340; 340/309.1, 309.4, 340/311.1, 835.22, 825.26, 825.27, 825.44, 340/825.47, 825.48, 7.32, 636.1, 636.12, 340/636.17, 636.18, 636.19, 636.2; 375/202, 375/224; 379/88.12, 88.13, 105, 104, 102, 379/201.01, 201.05, 211.01, 211.02, 212.01
See application file for complete search history.

(56) References Cited

U.S. PATENT DOCUMENTS

| | | | | |
|---|---|---|---|---|
| 5,252,963 A | * | 10/1993 | Snowden et al. | 340/7.38 |
| 5,475,374 A | * | 12/1995 | Moore | 340/825.22 |
| 5,701,329 A | * | 12/1997 | Croft et al. | 375/224 |
| 6,138,032 A | * | 10/2000 | Hill et al. | 455/517 |
| 6,253,088 B1 | * | 6/2001 | Wenk et al. | 455/462 |
| 6,317,593 B1 | * | 11/2001 | Vossler | 455/414.1 |
| 6,445,937 B1 | * | 9/2002 | daSilva | 455/574 |

(Continued)

FOREIGN PATENT DOCUMENTS

EP    0 711 089    5/1996

(Continued)

*Primary Examiner*—Nay A Maung
*Assistant Examiner*—Paul P Tran
(74) *Attorney, Agent, or Firm*—McCarthy Tétrault LLP Algorithm 300

(57) ABSTRACT

The invention provides a system and method for controlling operation of a communication device. The communication device comprises: a casing for housing a display and a keyboard; and a microprocessor controlling aspects of the keyboard and display. The invention provides a power application operating on the microprocessor. The application monitors activation cycles of the device, stores activation data related to the activation cycles and identifies a new activation cycle for the device utilizing an activation pattern derived from the activation data.

20 Claims, 3 Drawing Sheets

U.S. PATENT DOCUMENTS

| | | | |
|---|---|---|---|
| 6,463,278 B2 * | 10/2002 | Kraft et al. | 455/418 |
| 7,016,705 B2 * | 3/2006 | Bahl et al. | 455/566 |
| 7,194,248 B2 * | 3/2007 | Kim | 455/343.1 |
| 7,239,896 B1 * | 7/2007 | Hill et al. | 455/574 |
| 7,408,887 B2 * | 8/2008 | Sengupta et al. | 370/252 |
| 7,522,065 B2 * | 4/2009 | Falcon | 340/686.6 |
| 2001/0031651 A1 * | 10/2001 | Nakae et al. | 455/572 |
| 2002/0012325 A1 * | 1/2002 | Kikkawa et al. | 370/311 |
| 2002/0142792 A1 * | 10/2002 | Martinez | 455/550 |
| 2002/0174371 A1 | 11/2002 | Padawer et al. | |
| 2003/0008671 A1 * | 1/2003 | Lundgren et al. | 455/456 |
| 2003/0153368 A1 * | 8/2003 | Bussan et al. | 455/574 |
| 2004/0097218 A1 | 5/2004 | Vossler | |
| 2004/0214616 A1 * | 10/2004 | Malcolm | 455/574 |
| 2005/0101314 A1 * | 5/2005 | Levi | 455/423 |

FOREIGN PATENT DOCUMENTS

| | | |
|---|---|---|
| EP | 1 063 837 | 12/2000 |
| WO | WO 00/52847 | 9/2000 |
| WO | WO 03/043356 | 5/2003 |

\* cited by examiner

Figure 2

| Weekday Cycle (Monday to Friday) 202 ||
|---|---|
| Turn on device at: | Turn off device at: |
| XX:XX AM/PM 204 | XX:XX AM/PM 206 |
| Weekday Cycle (Saturday, Sunday) 208 ||
| Turn on device at: | Turn off device at: |
| XX:XX: AM/PM 210 | XX:XX: AM/PM 212 |

Sleep Mode: Full / Partial 214

Accept program? (Y/N) 216

Screen 200

Algorithm 300

SYSTEM AND METHOD FOR ACTIVATING A COMMUNICATION DEVICE BASED ON USAGE INFORMATION

FIELD OF THE INVENTION

The present invention relates to a system and method controlling operation of a communication device, more particularly operation of the device using activation data associated with the device.

BACKGROUND

Current wireless handheld mobile communication devices perform a variety of functions to enable mobile users to stay current with information and communications, such as e-mail, corporate data and organizer information while they are away from their desks. A wireless connection to a server allows a mobile communication device to receive updates to previously received information and communications. The handheld devices optimally are lightweight, compact, and low power to facilitate usage by professionals on the go. In order to conserve battery power, the devices can be placed into reduced power or sleep modes, where portions of the device (such as the display and alarms) are either not used, powered off, or used in a restricted, power-saving mode. Such modes are generally programmable, wherein the user manually programs the device to have: (i) a start or sleep time; and (ii) an end or wake-up time. At the sleep time, the devices automatically enter a predetermined sleep mode and shut off predetermined portions of the devices. Generally in a sleep mode, sufficient power is still provided to the devices in order for it to maintain its data, essential programs and clock information and to operate programs and processes during the sleep mode. At the wake-up time, the devices are typically brought back to a full power mode, where all functionality of the devices are available to the user.

However, prior art systems and methods for power control of such devices are difficult to program, typically requiring that a user enter a series of on and off times for the device. Further, once a programmed time has been entered, a user may subsequently need to use the device during the sleep mode, thereby requiring him to manually activate the device from its sleep mode, then actively return the device to its sleep mode once he is finished with it. This can happen, for example, when the user has sent an early evening time for entering the sleep mode, but subsequently continually uses the device later in the evening before he goes to bed for the night.

There is a need for a system and method which addresses deficiencies in the prior art of selectively shutting down and turning on a communication device.

SUMMARY

In a first aspect, a handheld mobile communication device is provided. The communication device comprises: a casing for housing a display and a keyboard; a microprocessor controlling aspects of the keyboard and display; and a power application operating on the microprocessor. The application monitors activation cycles of the device, stores activation data related to the activation cycles and identifies a new activation cycle for the device utilizing an activation pattern derived from the activation data.

In the device, the power application may monitor a status at least one of: a sensor, a power switch and an activation event relating to the device to determine an activation boundary for at least one of the activation cycles.

In the device, the new activation cycle may progress through a fully on mode and a mode selected from a partially on mode and a fully off mode during its cycle.

In the device, the new activation cycle may adjust activation boundaries depending on the day of the week tracked by the device.

In the device, the activation cycle may progress through at least three different power modes during its cycle.

The device may further comprise an accelerometer. Therein the power application would monitor a status of the accelerometer to determine an activation boundary for at least one of the activation cycles.

In the device, the power application may utilize signals from the accelerometer to determine a distance displaced by the device.

In the device, the signals are used to determine when the device has moved from a resting position and when the device is returned to about the resting position.

In a second aspect, a method for controlling a power cycle for a mobile communication device is provided. The method comprises: monitoring activation cycles of the device; storing activation data related to the activation cycles; and identifying a new activation cycle for the device utilizing an activation pattern derived from the activation data.

In the method, monitoring activation cycles may comprise monitoring a status at least one of: a sensor, a power switch and an activation event relating to the device to determine an activation boundary for at least one of the activation cycles.

In the method, the new activation cycle may progress through a fully on mode and a mode selected from a partially on mode and a fully off mode during its cycle.

In the method, the new activation cycle may adjust activation boundaries depending on the day of the week tracked by the device.

In the method, the activation cycle may progress through at least three different power modes during its cycle.

In the method, an accelerometer may be used to monitor the activation cycles of the device.

In the method, signals from the accelerometer may be used to determine a distance displaced by the device.

In the method, the signals may be used to determine when the device is moved from a resting position and when the device is returned to about the resting position.

In other aspects various combinations of sets and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 2 illustrates a screen display provided on the device when operating the embodiment of FIG. 1.

DETAILED DESCRIPTION

Figure 1:
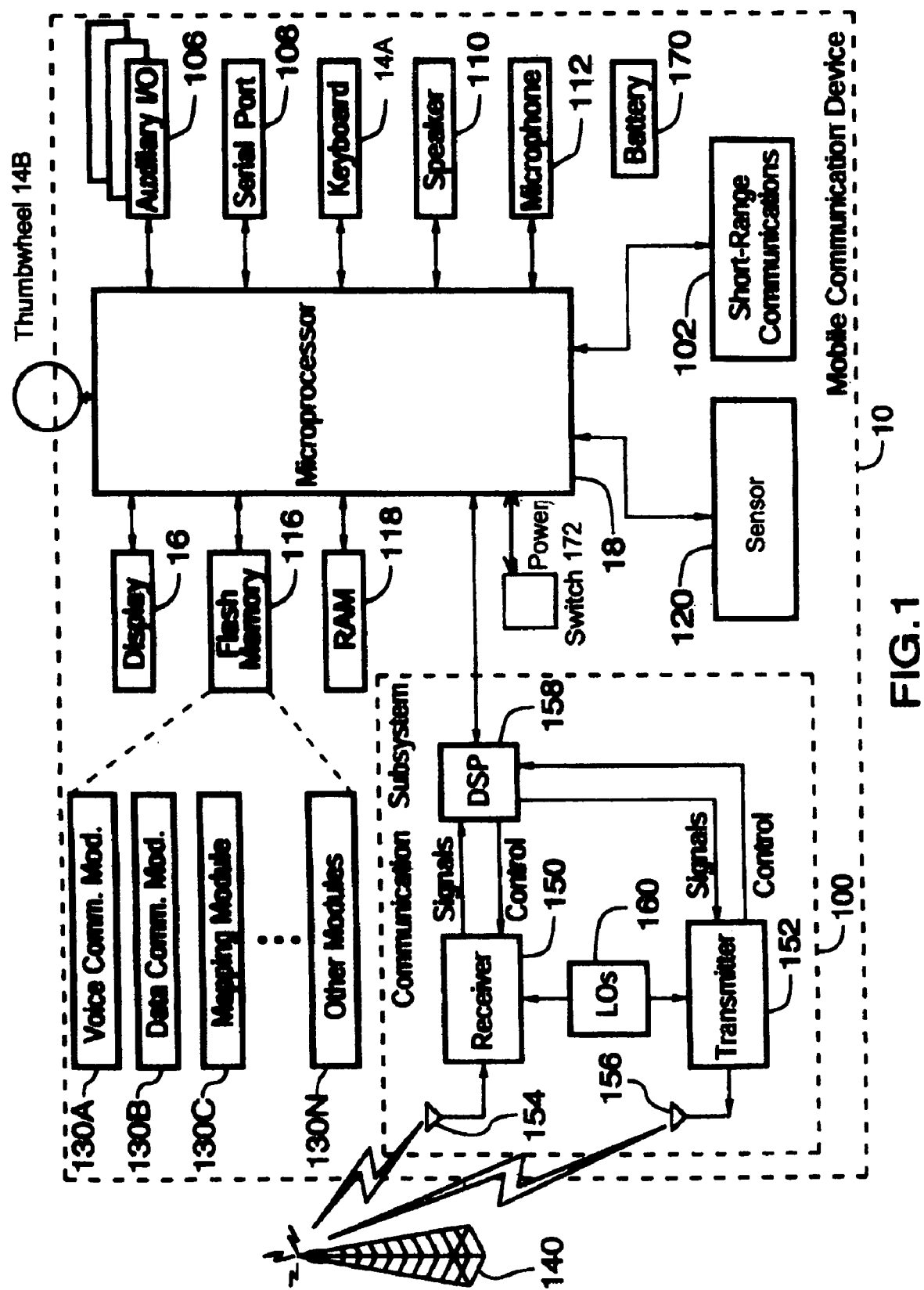
FIG. 1 illustrates a block diagram of an exemplary mobile device that incorporates an embodiment of the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

FIG. 1 illustrates a handheld mobile communication device 10 including a housing, an input device (e.g. keyboard 14A or thumbwheel 14B) and an output device (a display 16), which is preferably a graphic Liquid Crystal Display (LCD). Other types of output devices may alternatively be utilized. A processing device (a microprocessor 18) is shown schematically in FIG. 1 as coupled between keyboard 14A, thumbwheel 14B, display 16 and a series of other internal devices to device 10. The microprocessor 18 controls the operation of the display 16, as well as the overall operation of the device 10, in response to actuation of keys on the keyboard 14A or thumbwheel 14B by a user. Exemplary microprocessors for microprocessor 18 include Data 950 (trade-mark) series microprocessors and the 6200 series microprocessor, both available from Intel Corporation.

Physically for device 10, its housing may be elongated vertically, or may take on other sizes and shapes (including clamshell housing structures). The keyboard may include a mode selection key, or other hardware or software for switching between text entry and telephony entry.

Although not shown as a separate item, when display 16 is implemented as a LCD, a backlighting system is almost invariably used to assist in the viewing display 16, especially under low-light conditions. A typical backlighting system comprises a series of LEDs and a controller to control activation of the LEDs. Depending on a brightness level selected for display 16, all or some of the LEDs may be powered in a full duty cycle or a duty-cycle approaching 0%.

In addition to the microprocessor 18, other internal devices of the device 10 are shown schematically in FIG. 1. These devices include: a communication subsystem 100, a short-range communication subsystem 102, keyboard 14A, thumbwheel 14B and display 16. Other input/output devices include a set of auxiliary I/O devices 106, a serial port 108, a speaker 110 and a microphone 112. Memory for device 10 is provided in flash memory 116 and Random Access Memory (RAM) 118. Finally, additional sensor 120 and various other device subsystems (not shown) are provided. The device 10 is preferably a two-way radio frequency (RF) communication device having voice and data communication capabilities. In addition, device 10 preferably has the capability to communicate with other computer systems via the Internet.

Operating system software executed by the microprocessor 18 is preferably stored in a computer readable medium, such as flash memory 116, but may be stored in other types of memory devices, such as read only memory (ROM) or similar storage element. In addition, system software, specific device applications, or parts thereof, may be temporarily loaded into a volatile store, such as RAM 118. Communication signals received by the mobile device may also be stored to RAM 118.

Microprocessor 18, in addition to its operating system functions, enables execution of software applications on device 10. A set of software applications that control basic device operations, such as a voice communication module 130A and a data communication module 130B, may be installed on the device 10 during manufacture or downloaded thereafter. Cell mapping module 130C may also be installed on device 10 during manufacture. As well, additional software modules, illustrated as an other software module 130N, which may be, for instance, a personal information manager (PIM) application, may be installed during manufacture or downloaded thereafter into device 10. PIM application is preferably capable of organizing and managing data items, such as e-mail messages, calendar events, voice mail messages, appointments, and task items. PIM application is also preferably capable of sending and receiving data items via a wireless network 140. Preferably, data items managed by PIM application are seamlessly integrated, synchronized and updated via wireless network 140 with device user's corresponding data items stored or associated with a host computer system.

Communication functions, including data and voice communications, are performed through the communication subsystem 100, and possibly through the short-range communication subsystem 102. Communication subsystem 100 includes receiver 150, transmitter 152 and one or more antennas, illustrated as receive antenna 154 and transmit antenna 156. In addition, communication subsystem 100 also includes processing module, such as digital signal processor (DSP) 158 and local oscillators (LOs) 160. The specific design and implementation of communication subsystem 100 is dependent upon the communication network in which device 10 is intended to operate. For example, communication subsystem 100 of the device 10 may be designed to operate with the Mobitex (trade-mark), DataTAC (trade-mark) or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Other types of data and voice networks, both separate and integrated, may also be utilized with device 10.

Network access requirements vary depending upon the type of communication system. For example, in the Mobitex (trade-mark) and DataTAC (trade-mark) networks, mobile devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, device 10 may send and receive communication signals over communication network 140. Signals received from communication network 140 by the receive antenna 154 are routed to receiver 150, which provides for signal amplification, frequency down conversion, filtering, channel selection, etc., and may also provide analog to digital conversion. Analog-to-digital conversion of received signals allows the DSP 158 to perform more complex communication functions, such as signal demodulation and decoding. In a similar manner, signals to be transmitted to network 140 are processed (e.g., modulated and encoded) by DSP 158 and are then provided to transmitter 152 for digital to analog conversion, frequency up conversion, filtering, amplification and transmission to communication network 140 (or networks) via the transmit antenna 156.

In addition to processing communication signals, DSP 158 provides for control of receiver 150 and transmitter 152. For example, gains applied to communication signals in receiver 150 and transmitter 152 may be adaptively controlled through automatic gain control algorithms implemented in DSP 158.

In a data communication mode, a received signal, such as a text message or web page download, is processed by the communication subsystem 100 and is input to microprocessor 18. The received signal is then further processed by microprocessor 18 for an output to the display 16, or alternatively to some other auxiliary I/O devices 106. A device user may also compose data items, such as e-mail messages, using keyboard 14A, thumb-wheel 14B and/or some other auxiliary I/O device 106, such as a touchpad, a rocker switch or some other type of input device. The composed data items may then be transmitted over communication network 140 via communication subsystem 100.

In a voice communication mode, overall operation of device 10 is substantially similar to the data communication mode, except that received signals are output to speaker 110, and signals for transmission are generated by microphone 112. Alternative voice or audio I/O subsystems, such as a voice message recording subsystem, may also be implemented on device 10. In addition, display 16 may also be utilized in voice communication mode, for example, to display the identity of a calling party, the duration of a voice call, or other voice call related information.

Short-range communication subsystem 102 enables communication between device 10 and other proximate systems or devices, which need not necessarily be similar devices. For example, the short-range communication subsystem may include an infrared device and associated circuits and components, or a Bluetooth (trade-mark) communication module to provide for communication with similarly-enabled systems and devices.

Powering the entire electronics of the mobile handheld communication device is power source 170. Preferably, the power source 170 includes one or more batteries. More preferably, the power source 170 is a single battery pack, especially a rechargeable battery pack.

Power switch 172 provides an "on/off" switch for device 10. Upon activation of power switch 172 a process operating on device 10 is initiated to turn on device 10. Upon deactivation of power switch 172, another process is initiated to turn off device 10. Power to device 10 may also be controlled by other devices and by internal software applications, as described further below.

The embodiment provides a system and method for programming device 10 to enter a partially on (i.e. sleep) mode wherein device 10 operates in a lower power consumption mode than when all components of device 10 are powered. Device 10 can be placed in one of several power consumption modes including: a fully on mode, a partially on mode and a fully off mode. The embodiment also provides a learning mode wherein time activation boundaries for the sleep mode can be learned by device 10 by monitoring its usage. This is accomplished by monitoring for activation of device 10 (by monitoring for example, use of the device, powering on of the device or sensing movement of the device) and power application software installed on device 10. Each is described in turn.

For monitoring for activation of device 10, the power application can detect activation of power switch 172. In addition, device 10 has one or more sensors 120 which can be used to detect its state of activation. Each sensor 120 is an activation sensor providing an indication of movement or usage of device 10. The activation sensor may be a mercury switch, an accelerometer or any other motion sensing device which can be incorporated within device 10. If sensor 120 is implemented as a mercury switch (or a comparable tilt switch), then electrical signals generated from the switch are provided to microprocessor 18 and software operating on microprocessor 18 is provided to detect signals from the switch and to determine whether the signals received mean that device 10 is at rest or is moving. If sensor 120 is implemented as an accelerometer, signals therefrom can be used by the power application to detect motion and to detect a displacement vector, since accelerometers, as force measuring devices, provide force information which can be used to derive displacement information using mathematical integration methods. As such, signals from the accelerometer can be used to detect when device 10 is moved from its resting position to an active position and when device 10 is returned to its resting position. Alternatively still, sensor 120 may be a spring loaded switch which is in one position (either open or closed) when device 10 is placed flatly on a surface (e.g. flat on its back, if sensor 120 is a spring-loaded switch located on the back of device 10) and is automatically switched to a second position (either closed or open) when device 10 is lifted from the surface. In still another sensing arrangement, if device 10 is electrically connected to a docking station, allowing device 10 to communicate with another device such as a computer (not shown), then the application can detect when device 10 is docked and undocked in its cradle. Other embodiments may use wireless systems, such as Bluetooth-enabled (trademark) systems, to detect when device 10 is near a detecting or docking station. Other types of sensors known in the art may be used for sensor 120. For each type of sensor 120, depending on its sensing dynamics, one detection of one state will indicate that device 10 is being moved and detection of another state will indicate that device 10 has stopped being moved. It will be appreciated that for each of the different types of sensors for motion sensor 120, an appropriate software interface is provided to enable to the power application to register the status of sensor 120.

Alternatively, sensor 120 is a light sensor which is used by power application to detect when it is in a lit, dimly lit or unlit environment or when it is nighttime or daylight environment. The power application may also use data from sensor 120 with its data on the current time, date and location of device 10 to determine ambient daylight conditions for device 10. In other embodiments, multiple sensors 120 may be provided and the power application may provide different emphasis on signals provided from different sensors 120.

For the power application, it is embodied in a software application (for example, as one of the software applications described above) enabling it to selectively control power of one or more internal elements of device 10, including, for example, display 16, keyboard 14A, thumbwheel 14B, microphone 112, short range communication module 102 and communication subsystem 100. The power application operates on microprocessor 18, has access to the system clock of device 10 and can selectively provide power control signals to one or more of the internal elements. Such power control signals include signals: to turn off the element completely; activate the element in a full power, full capability mode; and activate the element in a mode which provides capabilities somewhere between full power and no power.

The power application operates in several modes. A first mode is an initial programming mode where a user enters a time schedule as an activation cycle for device 10. A second mode is a learning mode where actual activation cycles for device 10 are tracked and stored as activation data. A third mode analyzes the activation data, identifies one or more patterns for activation cycles from the activation data, and selectively identifies a new activation schedule(s) for device 10. Each mode is described in turn.

Referring to FIG. 2, for the first mode, device 10 has a programming mode allowing its user to enter specific time data relating to an activation cycle for device 10. Typically, the user accesses a programming menu in device 10 and accesses a scheduler, then enters data for an activation cycle using keyboard 14A. Alternatively, such data can be downloaded to device 10 from a remote source. Once the user accesses the programming menu, power application generates screen 200 on display 16 which is a daily diary in a graphical format allowing the user to enter activation times and events into the diary. Screen 200 provides display text 202 inviting the user to enter "on" and "off" times in weekday fields 204 and 206 as activation boundaries for weekdays. Similarly, text prompts 208 and fields 210 and 212 allow the user to enter "on" and "off" times as activation boundaries for weekend cycles. Text on the screen may also invite the user to select what level of power is to be provided during a sleep mode at field 214. Once the data is entered by the user and submitted to device 10 using activation field 216, power application processes the time data and updates or generates an activation cycle for device 10. Thereafter, power application monitors its internal clock to determine the current time and date and automatically turns on and off identified elements in device 10 according to the time data stored for the activation cycle. The deployment and implementation of the scheduler may be implemented in any programming language.

Also, power application allows device 10 to automatically move from one power state to another when a predetermined event occurs. Such an event can be considered to be an "auto-on" or "auto-off" event for device 10. For example, if device 10 is in a low power mode where short range communication subsystem 102 is enabled and then device 10 receives a message through subsystem 102, power application can be set to cause device 10 to move to a full power mode. Alternatively, if subsystem 102 is enabled and no message is received after a certain set time limit, power application can be set to cause device 10 to move to a lower power mode and disable power to subsystem 102. Signals and absence of signals from other elements in device 10 can be used by the power application to change the power state of device 10. To allow entry of such "auto-on" and "auto-off" events, device 10 provides a similar user interface of menu screen(s) on display 16 to screen 200.

For the second mode of operation, power application provides learning of actual times of activation of device 10 by having device 10 detect and track when it is being used and not used. Generally, there are two steps for learning of actual activation times. The first step is to place device 10 into a learning mode for the activation cycles of the device as it is normally used. The second step is to collect time and event data for the activation cycles to determine activation boundaries for a new activation cycle based on the collected data. Each is described in turn.

For the first step of the second mode, device 10 allows the user to initiate the learning mode by making a selection in the programming menu of device 10. Alternatively, the learning mode may always be activated or may be programmed to be activated at a certain time or after detection of a certain event.

For the second step of the second mode, data is collected on usage and non-usage times of device 10. One technique for detecting when device 10 is being used is to infer usage when device 10 is detected as it is being moved. For example, when a user is finished with device 10 for the day, he may rest it on a desk in a resting position. If the user subsequently picks up device 10, it detects movement from the resting position. Another technique is to detect when the device is activated, e.g. when it is turned on using power switch 172, when a key is depressed, when the thumbwheel is turned or depressed or when it is docked to a docking device.

Upon detection of use of device 10, power application begins a timer which is used to track time of use after activation. After a predetermined length of time of non usage (e.g. 5, 10, 15, 20, 30, 45, 60 minutes or more), power application can selectively mark device 10 as not being used and can place device 10 in a lower power consumption mode. The absence of use may be determined by monitoring the presence or absence of an event. For example the events may include: activation or non-activation of a key on keyboard 14A or scrolling, depressing or non-activation of thumbwheel 14B, movement or non-movement of device 10, active turn off of device 10, docking or undocking of device 10 from a docking device and return of device 10 to its resting position. The detection of use and then the detection of absence of use would complete one activation cycle for device 10. Power application tracks the time and duration of this activation cycle.

Power application tracks several activation cycles (as described above) over several intervals. The intervals can be any number of hours, days, weeks, months or any other time interval. These intervals can be programmed into the power application.

For the third mode of the operation, the power application analyzes the time and event data stored in the second mode; identifies any time and event pattern(s) from the activation cycles; and utilizes the time and event patterns to identify a new activation cycle.

An example of an analysis of time data for the third mode is provided where the user of device 10 habitually uses device 10 on around 10:45 PM (+/−15 minutes), uses it for between 5 to 20 minutes, then does not use it again until sometime between 8:00 to 9:00 AM the next morning. By analyzing the data, power application determines at least one optimum time to turn device 10 for the remainder of the day and at least one optimum time to activate device 10 at the start of the next day.

To identify a turn off time, the time data may be analyzed for patterns to identify when the device was turned on at night, for how long and on what days. Using a conservative power consumption approach, power application may set a turn off time for the new activation cycle as some time after the latest turn on time at night. Similarly, to identify a turn on time, the time data may be analyzed for patterns in when the device was turned on in the morning and on what days. Again, using a conservative approach, power application may identify a new activation cycle to turn on time as some time before the earliest turn on time. Other more aggressive approaches may be used to determine either a turn off or turn on time. The patterns may also identify weekend usage patterns, seasonal patterns and holiday patterns. The patterns may also identify a staged increase or decrease of usage of device 10. For example, after a certain time at night, only selected functionalities are disabled, but when the time moves to the middle of the night, then one or more functionalities are also disabled. As the time moves to the early morning, one or more of the functionalities are selectively enabled.

It will be appreciated that the first programming mode of operation of device 10 does not necessarily have to be executed in order to perform the second mode.

It will be appreciated that the data may be sent to a central server for further analysis and use with other data. For example, there the activation cycle may be linked to a heating cycle of the home of the user.

Figure 3:
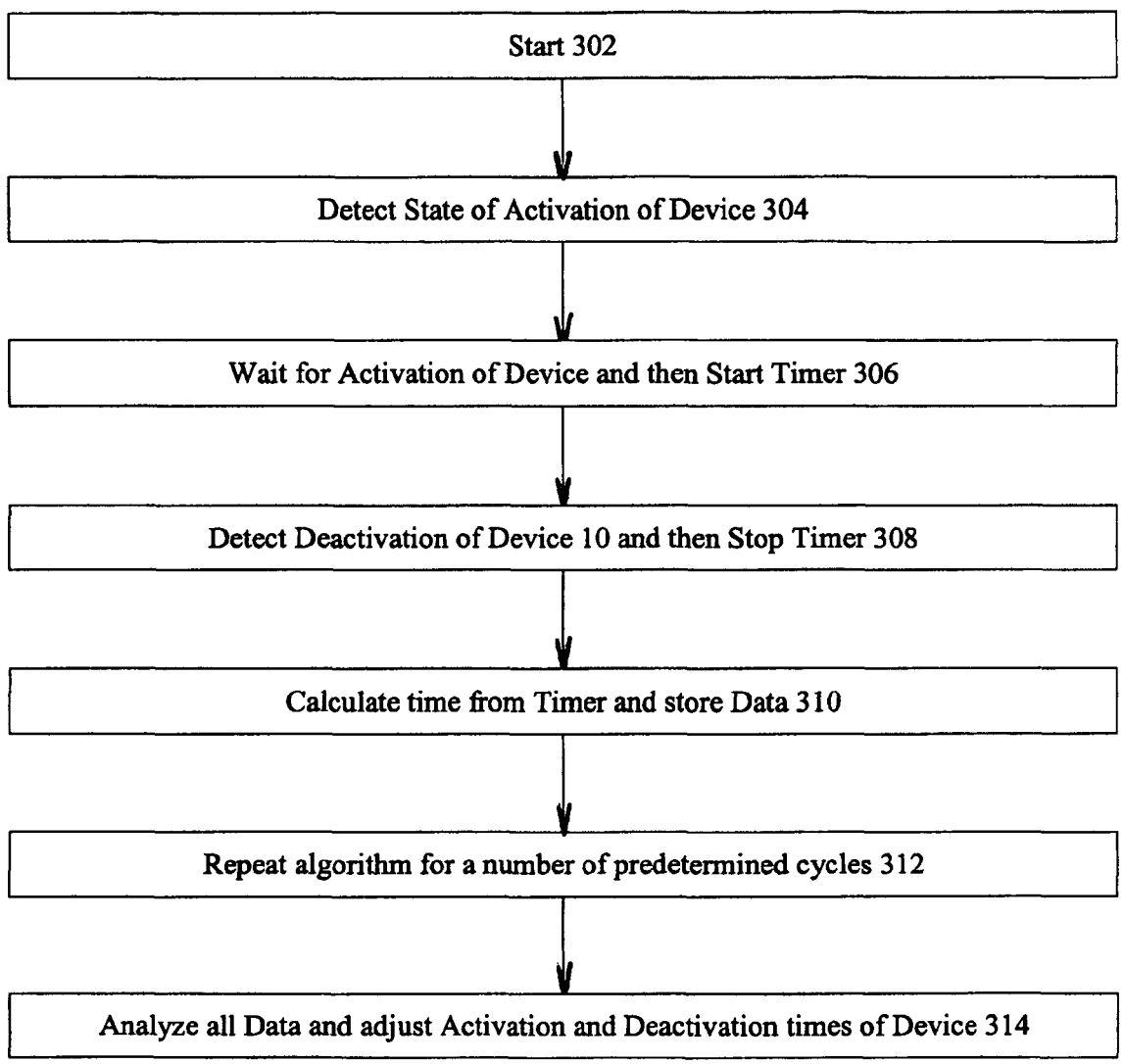
FIG. 3 illustrates a flow diagram of programming a new activation cycle process associated with the embodiment of FIG. 1.

Referring now to FIG. 3, further detail is provided on the operation of the second mode of power application, where algorithm 300 is shown. After start process 302, power application detects the state of activation of device 10 and waits for it to be deactivated, if necessary, in step 304. Next, in step 306, power application waits for activation of device 10 and then starts a timer. As noted above, activation of the device can be triggered from a signal from sensor 120, activation of switch 172, depressing of the keyboard or detection of an "auto-on" event. The timer is implemented in software using the internal clock available from microprocessor 18 and data for the timer is stored in memory 116. Next, the power application waits for detection of deactivation of device 10 and then stops the timer per step 308. Similarly, deactivation of device 10 can be triggered from another signal from sensor 120, deactivation of switch 172, or detection of an "auto-off" event. In step 310, after deactivation of device 10 is detected, power application calculates a time for the activation cycle just completed from the data associated with the timer and stores additional data relating to the activation cycle, such as the exact start time and date, the end time and date, and the events triggering the beginning and end of the cycle. Steps 306, 308 and 310 are repeated for a number of predetermined cycles in step 312 to generate a historic set of data. Finally, in step 314, the historic data is analyzed and an adjustment of activation and deactivation times for device 10 is made based on the analysis of the historic data. For example, if the data indicates that for every weekday the device is at rest (process 306) at about 10:30 p.m. every night, until 6:30 a.m. the next morning, the power application can use the information to place device 10 in a fully off mode or partially on mode between 10:30 p.m. (or shortly thereafter) until 6:30 a.m. (or shortly therebefore). Such events can be tracked in a data log and counters can be used to track "on" and "off" times.

Time granularity filters can be applied such that times are recorded in adjustable increments, e.g. every 5, 6, 10, 15, 20 or 30 minutes, thereby reducing the number of different times which are tracked by the power application. Additionally, days can be tracked allowing different power control modes to be implemented during weekdays and weekends. The analysis can also filter out activation and deactivation cycles which do not occur with sufficient frequency to indicate a continually repeated activation pattern. Furthermore, user profiles can also be used as time filters. Exemplary user profiles such as "Vacation Mode", "Travel Mode" and "Meeting Mode" may be provided which systematically configure an appropriate power cycle for device 10. For example, each mode may change the on-time and off-time for specific days, weekdays and weekends according to expected usage patterns during a vacation, traveling (e.g. while flying and in a restricted usage area in an airport) and while attending a meeting.

It will be appreciated that algorithm 300 may be implemented as a series of interrupt routines, thereby allowing other applications to operate concurrently with it in a real time manner. Other implementations providing real time detection and monitoring of usage may be used.

Further detail is now provided on the power modes of device 10. As noted earlier, the power application can adjust activation of components for power consumption of device 10, by having it operate in a fully on mode, a fully off mode and a partially on mode. In the fully off (deep sleep) mode, power is provided to only a minimal set of component to enable device 10 to operate. These components typically include those which at a minimum, provide power to microprocessor 18 and its related memory, clocks and other devices to allow device 10 to maintain its internal clock, software applications and data, and recognize a stimulus (e.g. activation of the power on button) to revive device 10 from its fully off/deep sleep mode.

In the partially on mode one or more functionalities of device 10 are either disabled or reduced. For example, one or both of communication system 100 and communication subsystem 102 may be disabled. Also, the backlighting system for display 16 may be reduced in intensity; to conserve power, the backlight system is either set to activate the LEDs at a low duty cycle frequency or not activate the LEDs at all. Other internal devices of device 10 can also be programmed to operate in different power modes. It will be appreciated that there may be several partially on modes where different sets of functionalities may be enabled/disabled in each mode. Further, power to other internal devices of device 10 may controlled by a power cycle controlled by the embodiment. Such other devices can include: a radio transmitter, a radio receiver, blacklighting for the display, a microphone, an LED indicator, a speaker and a vibrator motor. Power provided to any such device can be varied on the sleep level of device 10.

It will be appreciated that in one embodiment, no additional hardware elements are required to implement the system over an existing device. All usage signals to turn on and turn off the device are generated from existing interfaces and switches.

It will be appreciated that the collected data may be provided from device 10 to a remote device, such as a web server. At the remote device, the data can be analyzed and used to operate other devices. For example, a user's sleeping pattern identified by the embodiment may be sent to the server. Then, from the server, appropriate software can then remotely downloaded data relating to the pattern to an electronic thermostat associated with the residence of the user. At the thermostat, its programmable temperature cycle(s) can be configured to appropriately reduce its target temperature during the sleep cycles identified in the pattern. Similarly, a programmable alarm system may be able to use the sleep pattern data to configure different alarm conditions and monitoring modes for the residence.

Although the invention has been described with reference to certain specific embodiments, various modifications thereof will be apparent to those skilled in the art without departing from the scope of the invention as outlined in the claims appended hereto.

We claim:

1. A handheld mobile communication device, comprising:
a display;
a memory device;
an accelerometer;
a microprocessor controlling aspects of said display; and
a power application module operating on said microprocessor to analyze signals from said accelerometer to
determine a movement from, and a return to, a resting location for said device to determine activation times of said device;
store and retrieve activation times in said memory device;
identify a new activation cycle that
has an activation time and a deactivation time derived from said activation times,
deactivates an additional component in said device in an existing activation cycle that is operable on said device during said new activation cycle and
runs through a power consumption mode selected from at least an on mode, an off mode, and a sleep mode, monitor a status of said accelerometer to determine an activation boundary for at least one of said activation cycles;

begin a timer to track time of use of said device after activation of said device; and after a predetermined length of time of non usage of said device or upon a predetermined event detected by said device, place said device in a lower power consumption mode.

2. The handheld mobile communication device of claim 1, wherein said power application further monitors a status at least one of a sensor, a power switch and an activation event relating to said device to determine said activation times.

3. The handheld mobile communication device of claim 2, wherein:

said new activation cycle runs through said on mode and a mode selected from one of said sleep mode and said off mode during its cycle;

said sleep mode comprises a plurality of partially on modes where different sets of functionalities for said device are enabled depending on at least one of a detected time or day of the week for said device; and said activation time and said deactivation time are determined from patterns identified in said activation times.

4. The handheld mobile communication device as claimed in claim 3, wherein said new activation cycle adjusts activation boundaries depending on a day of a current week tracked by said device.

5. The handheld mobile communication device as claimed in claim 4, wherein said activation and deactivation times of said new activation cycle are different from activation data for other activation cycles.

6. The handheld mobile communication device as claimed in claim 1, wherein a connection signal to a docking station is also used to determine when said device has been moved from said resting position and return of said device to about said resting position.

7. The handheld mobile communication device of claim 5, wherein one of said at least two partially on modes deactivates said display and another of said at least two partially on modes deactivates said display and a communications module operating on said device.

8. The handheld mobile communication device of claim 1, wherein said activation data is provided to a remote server for use in controlling a second device remote from said communication device.

9. A method for controlling a power cycle for a mobile communication device, comprising:

analyzing signals from an accelerometer in said device to determine a movement from, and a return to, a resting location for said device to determine activation times of said device of activation cycles of said device;

storing said activation times related to said activation cycles;

identifying a new activation cycle that has an activation time and a deactivation time derived from said activation times, said new activation cycle set to deactivate an additional component in said device in an existing activation cycle that is operable on said device during said existing activation cycle, and run through a power consumption mode selected from at least an on mode, an off mode, and a sleep mode;

monitoring for a status of said accelerometer to determine an activation boundary for at least one of said activation cycles;

initiating a timer to track time of use of said device after activation of said device; and after a predetermined length of time of non usage of said device or upon a predetermined event detected by said device, placing said device in a lower power consumption mode.

10. The method for controlling a power cycle for a mobile communication device as claimed in claim 9, wherein said monitoring activation cycles of said device further comprises monitoring a status at least one of a sensor, a power switch and an activation event relating to said activation times.

11. The method for controlling a power cycle for a mobile communication device as claimed in claim 10, wherein:

said new activation cycle runs through said on mode and a mode selected from one of said sleep mode and said off mode during its cycle;

said sleep mode comprises a plurality of partially on modes where different sets of functionalities for said device are enabled depending on at least one of a detected time or day of the week for said device; and said activation time and said deactivation time are determined from patterns identified in said activation times.

12. The method for controlling a power cycle for a mobile communication device as claimed in claim 11, wherein said new activation cycle adjusts activation boundaries depending on a day of a week tracked by said device.

13. The method for controlling a power cycle for a mobile communication device as claimed in claim 12, wherein said activation and deactivation times of said new activation cycle are different from activation times for other activation cycles.

14. The method for controlling a power cycle for a mobile communication device as claimed in claim 9, wherein a connection signal to a docking station is also used to determine when said device has been moved from said resting position and return of said device to about said resting position.

15. The method for controlling a power cycle for a mobile communication device as claimed in claim 13, wherein said sleep mode deactivates said display.

16. The method for controlling a power cycle for a mobile communication device as claimed in claim 13, wherein said sleep mode deactivates said display and a communications module operating on said device.

17. The method for controlling a power cycle for a mobile communication device as claimed in claim 13, wherein said activation data is provided to a remote server for use in controlling a second device remote from said communication device.

18. A handheld mobile communication device, comprising:

a display;

a memory device;

an accelerometer;

a microprocessor controlling aspects of said display; and a power application module operating on said microprocessor to analyze signals from said accelerometer to identify movements of said device to determine activation times of said device, store and retrieve said activation times in said memory device, identify a new activation cycle that has an activation time and a deactivation time derived from said activation times, deactivates an additional component in said device in an existing activation cycle that is operable on said device during said new activation cycle, and runs through a power consumption mode selected from at least an on mode, an off mode, and a sleep mode, monitor a status of said accelerometer to determine an activation boundary for at least one of said activation cycles;

begin a timer to track time of use of said device after activation of said device; and after a predetermined length of time of non usage of said device or upon a predetermined event detected by said device, place said device in a lower power consumption mode.

19. The handheld mobile communication device of claim 18, wherein said power application analyzes signals from said accelerometer to determine a movement from, and a return to, a resting location for said device to determine said activation times for said activation cycles.

20. The handheld mobile communication device of claim 18, wherein:

said new activation cycle runs through said on mode and a mode selected from one of said sleep mode and said off mode during its cycle;

said sleep mode comprises a plurality of partially on modes where different sets of functionalities for said device are enabled depending on at least one of a detected time or day of the week for said device; and said activation time and said deactivation time are determined from patterns identified in said activation times.

* * * * *